(12) United States Patent
Ogata et al.

(10) Patent No.: US 9,630,612 B2
(45) Date of Patent: Apr. 25, 2017

(54) VEHICLE ENGINE ACTIVATION CONTROL SYSTEM

(71) Applicant: TOYOTA JIDOSHA KABUSHIKI KAISHA, Toyota-shi, Aichi-ken (JP)

(72) Inventors: Masatoshi Ogata, Toyota (JP); Hirokazu Kato, Nisshin (JP); Natsumi Oami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/132,564

(22) Filed: Apr. 19, 2016

(65) Prior Publication Data

US 2016/0311434 A1 Oct. 27, 2016

(30) Foreign Application Priority Data

Apr. 24, 2015 (JP) ................................. 2015-089755

(51) Int. Cl.
| | |
|---|---|
| *B60W 10/18* | (2012.01) |
| *B60T 7/10* | (2006.01) |
| *B60T 7/12* | (2006.01) |
| *B60T 13/74* | (2006.01) |
| *F02N 11/08* | (2006.01) |
| *F16D 65/14* | (2006.01) |
| *F16D 125/60* | (2012.01) |

(52) U.S. Cl.
CPC ........... *B60W 10/182* (2013.01); *B60T 7/107* (2013.01); *B60T 7/122* (2013.01); *B60T 13/746* (2013.01); *F02N 11/0829* (2013.01); *F16D 65/14* (2013.01); *B60W 2540/04* (2013.01); *F16D 2125/60* (2013.01)

(58) Field of Classification Search
None
See application file for complete search history.

(56) References Cited

U.S. PATENT DOCUMENTS

| | | | |
|---|---|---|---|
| 7,665,808 B2 | 2/2010 | Deprez et al. | |
| 8,322,473 B2 * | 12/2012 | Hilberer | .................. B60T 7/122 180/244 |
| 2012/0330522 A1* | 12/2012 | Gibson | ................. B60W 10/06 701/70 |

FOREIGN PATENT DOCUMENTS

| | | |
|---|---|---|
| JP | 2012-035773 A | 2/2012 |
| JP | 2013-151884 A | 8/2013 |

* cited by examiner

*Primary Examiner* — Justin Holmes
(74) *Attorney, Agent, or Firm* — Oliff PLC

(57) ABSTRACT

A vehicle engine activation control system includes a starter connected to a battery; an input unit configured to generate an operation request in response to input from a driver; an electric parking brake device including an electric motor connected to the battery, wherein the electric motor starts driving in response to the operation request; an idle stop control unit configured to automatically stop an engine and automatically reactivate the engine by the starter; and a mediating unit configured to prohibit the driving of the electric motor in response to a predetermined operation request, in at least one of a case where the predetermined operation request is generated while the engine is automatically stopping or after the automatic stopping of the engine is completed, and a case where the predetermined operation request is generated during the reactivation of the engine.

4 Claims, 7 Drawing Sheets

VEHICLE ENGINE ACTIVATION CONTROL SYSTEM

BACKGROUND OF THE INVENTION

1. Field of the Invention

The present invention is related to a vehicle engine activation control system.

2. Description of the Related Art

An electric parking brake system that causes a parking brake to automatically operate by an electric motor, and a parking brake control device applied to a vehicle provided with an idle stop system that automatically stops the engine, are known (see, for example, Patent Document 1). This parking brake control device includes a parking brake control unit that causes a parking brake to automatically operate in a direction of applying a braking force according to the implementation of idle stopping, and a parking brake release unit that causes the parking brake to automatically operate in a direction of releasing the braking force when there is a request to release the idle stopping and automatically reactivate the engine. The parking brake release unit allows the automatic release, on condition that the start driving force of the vehicle is greater than or equal to a predetermined value.

[Patent Document 1] Japanese Laid-open Patent Publication No. 2012-035773

However, in the configuration described in Patent Document 1, the electric parking brake automatically operates in conjunction with the control state of idle stopping, and therefore the operation of the electric parking brake is implemented with no relation to the driver's intention, which is a problem in that the driver's intention cannot be reflected.

Meanwhile, if the electric parking brake control device is configured to operate according to input from the driver in order to reflect the driver's intention, the reactivation of the engine and the operation of the electric parking brake device are performed at the same time, and the load on the battery may become high. This is because the starter is driven when the engine is reactivated, and the electric motor is driven when the electric parking brake device operates, and the power of the battery is used for driving both of these elements.

SUMMARY OF THE INVENTION

According to one aspect of the present invention, a vehicle engine activation control system includes a starter connected to a battery; an input unit configured to generate an operation request in response to input from a driver; an electric parking brake device including an electric motor connected to the battery, wherein the electric motor starts driving in response to the operation request; an idle stop control unit configured to automatically stop an engine and automatically reactivate the engine by the starter; and a mediating unit configured to prohibit the driving of the electric motor in response to a predetermined operation request, in at least one of a case where the predetermined operation request is generated while the engine is automatically stopping or after the automatic stopping of the engine is completed, and a case where the predetermined operation request is generated during the reactivation of the engine.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE EMBODIMENTS

In the following, with reference to drawings, a description is given of the best mode for carrying out the present invention.

Figure 1A:
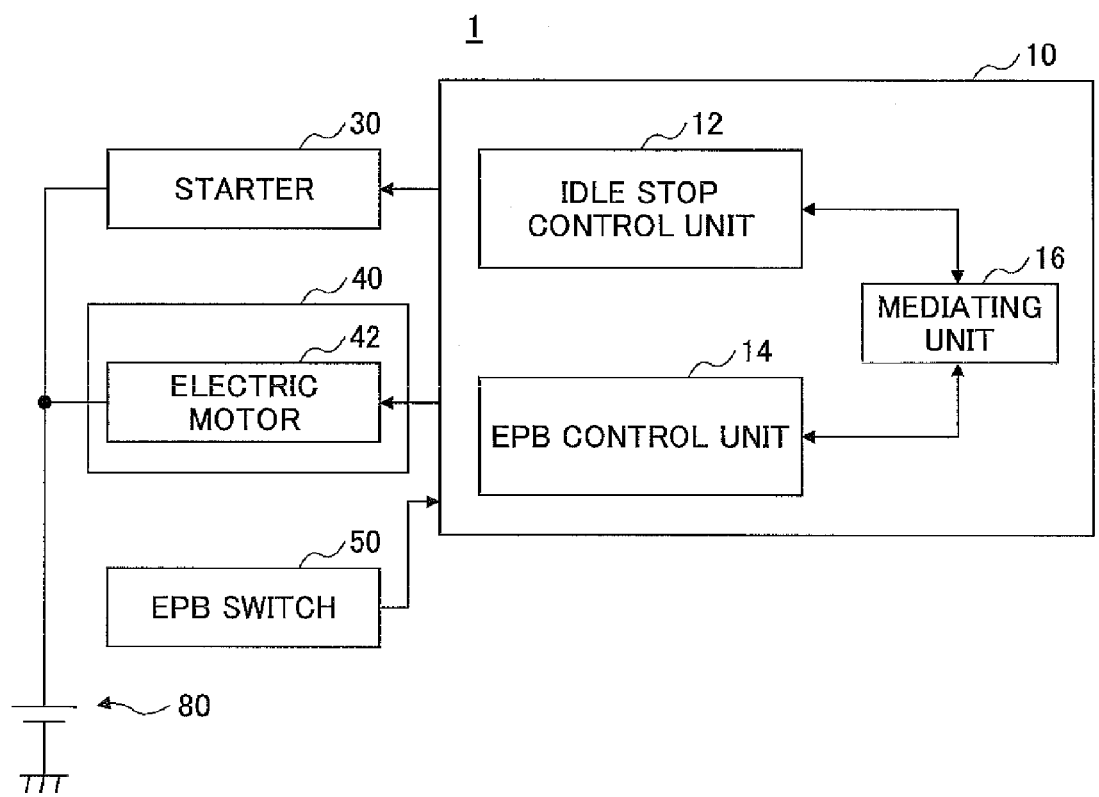
FIGS. 1A and 1B illustrate a vehicle engine activation control system according to an embodiment of the present invention.
Figure 1B:
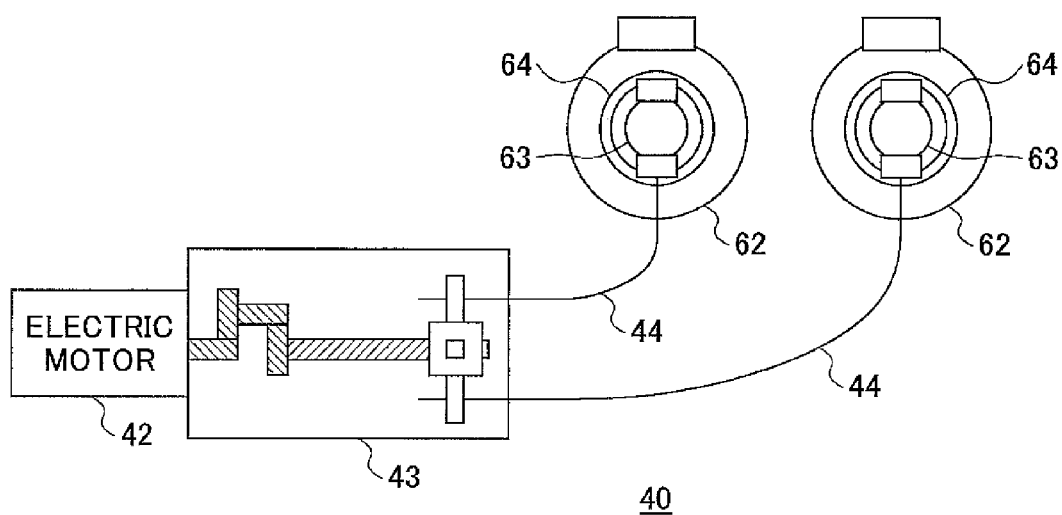

FIGS. 1A and 1B illustrate a vehicle engine activation control system 1 according to an embodiment of the present invention. FIG. 1A is a configuration diagram of the vehicle engine activation control system 1. FIG. 1B schematically illustrates an example of an electric parking brake device 40.

As illustrated in FIG. 1A, the vehicle engine activation control system 1 includes a control device 10, a starter 30, the electric parking brake device 40, and an EPB (Electric Parking Brake) switch 50.

The control device 10 is formed by a computer such as an ECU (Electronic Control Unit). The control device 10 may be realized by a plurality of computers. To the control device 10, the starter 30, an electric motor 42, and the EPB switch 50 are connected.

The control device 10 includes an idle stop control unit 12, an EPB control unit 14, and a mediating unit 16.

The idle stop control unit 12 executes idle stop control. The idle stop control is also referred to as S&S (Start & Stop). The idle stop control unit 12 causes an engine (not illustrated) to automatically stop, when a stop condition is established while the engine is operating. For example, when all of the following conditions (1) through (3) are satisfied, the stop condition is established.

Condition (1): The speed of the own vehicle is less than or equal to a predetermined speed.

Condition (2): The accelerator pedal is not stepped on.

Condition (3): The negative pressure inside the brake booster is closer to vacuum than a predetermined threshold.

Note that the conditions (1) through (3) are examples, and may be changed according to need. Furthermore, as an AND condition with respect to the conditions (1) through (3), conditions relevant to the state of operating the brakes by the driver, the state of air-conditioning, and the state of charging the battery (SOC: State Of Charge) may be added. In the following, the operation of automatically causing the engine to stop by the idle stop control unit 12 is referred to as "engine automatic stop". By stopping the supply of fuel to the engine (fuel cut), the idle stop control unit 12 starts the engine automatic stop. When the idle stop control unit 12 has started the engine automatic stop according to the establishment of the stop condition, the idle stop control unit 12 sets an executing S&S flag to "1". Note that while the executing S&S flag is "0", the idle stop control unit 12 may periodically determine whether the stop condition is established.

When a reactivation condition is established during the engine automatic stop or after the engine automatic stop has been completed, the idle stop control unit 12 drives the starter 30 and causes the engine to be automatically reactivated. During engine automatic stop means the period from when the engine automatic stop is started to when the engine speed becomes zero.

The EPB control unit 14 controls the electric motor 42. The EPB control unit 14 drives the electric motor 42 in response to a pressurizing request or a release request generated according to the operation state of the EPB switch 50. The pressurizing request is a signal requesting to apply a braking force on the wheel by the electric parking brake device 40, and the release request is a signal requesting to release the braking force applied on the wheel by the electric parking brake device 40.

An operation example of the mediating unit 16 is described below.

The starter 30 is connected to a battery 80. The starter 30 is driven by the power of the battery 80. The starter 30 is controlled by the idle stop control unit 12. The starter 30 is driven when the engine is activated (including the time of reactivation).

As illustrated in FIG. 1B, the electric parking brake device 40 includes the electric motor 42, a gear mechanism 43, and a cable 44. Furthermore, the electric parking brake device 40 includes the EPB control unit 14.

The electric motor 42 is provided on, for example, the rear wheel, together with the gear mechanism 43, the cable 44, etc. As illustrated in FIG. 1A, the electric motor 42 is connected to the battery 80. The electric motor 42 is driven by the power of the battery 80. The driving force of the electric motor 42 is transmitted to a brake shoe 63 used for parking, via the gear mechanism 43 and the cable 44. Accordingly, the brake shoe 63 is pressed against a brake drum 64, and a braking force is applied by the frictional force (parking braking force) between the brake shoe 63 and the brake drum 64.

The electric motor 42 is controlled by the EPB control unit 14. The EPB control unit 14 drives the electric motor 42 in a direction of applying a braking force to the wheel, in response to a pressurizing request. In the following, the operation of driving the electric motor 42 in a direction of applying a braking force to the wheel is also referred to as "pressurize driving". For example, the EPB control unit 14 pulls the cable 44 by normally rotating the electric motor 42, locks the wheel, and after locking the wheel, the EPB control unit 14 stops normally rotating the electric motor 42 and maintains the locked state by a maintaining device of the gear mechanism 43. The EPB control unit 14 drives the electric motor 42 in a direction of releasing the braking force applied to the wheel, in response to a release request. In the following, the operation of driving the electric motor 42 in a direction of releasing the braking force applied to the wheel is also referred to as "release driving". For example, the EPS control unit 14 operates the gear mechanism 43 such that the tension of the cable 44 is loosened by reverse rotating the electric motor 42.

The EPS switch 50 is provided in the vehicle interior. The EPB switch 50 generates a pressurizing request or a release request in response to input from the driver. The EPB switch 50 may have a form of, for example, a momentary switch. In this case, an electric signal that is generated when the EPB switch 50 is pressed when the electric parking brake device 40 is in a release state becomes a pressurizing request, and an electric signal that is generated when the EPB switch 50 is pressed when the electric parking brake device 40 is in a pressurize state becomes a release request.

Next, with reference to FIGS. 2 through 7, a description is given of an operation example of the vehicle engine activation control system 1.

Figure 2:
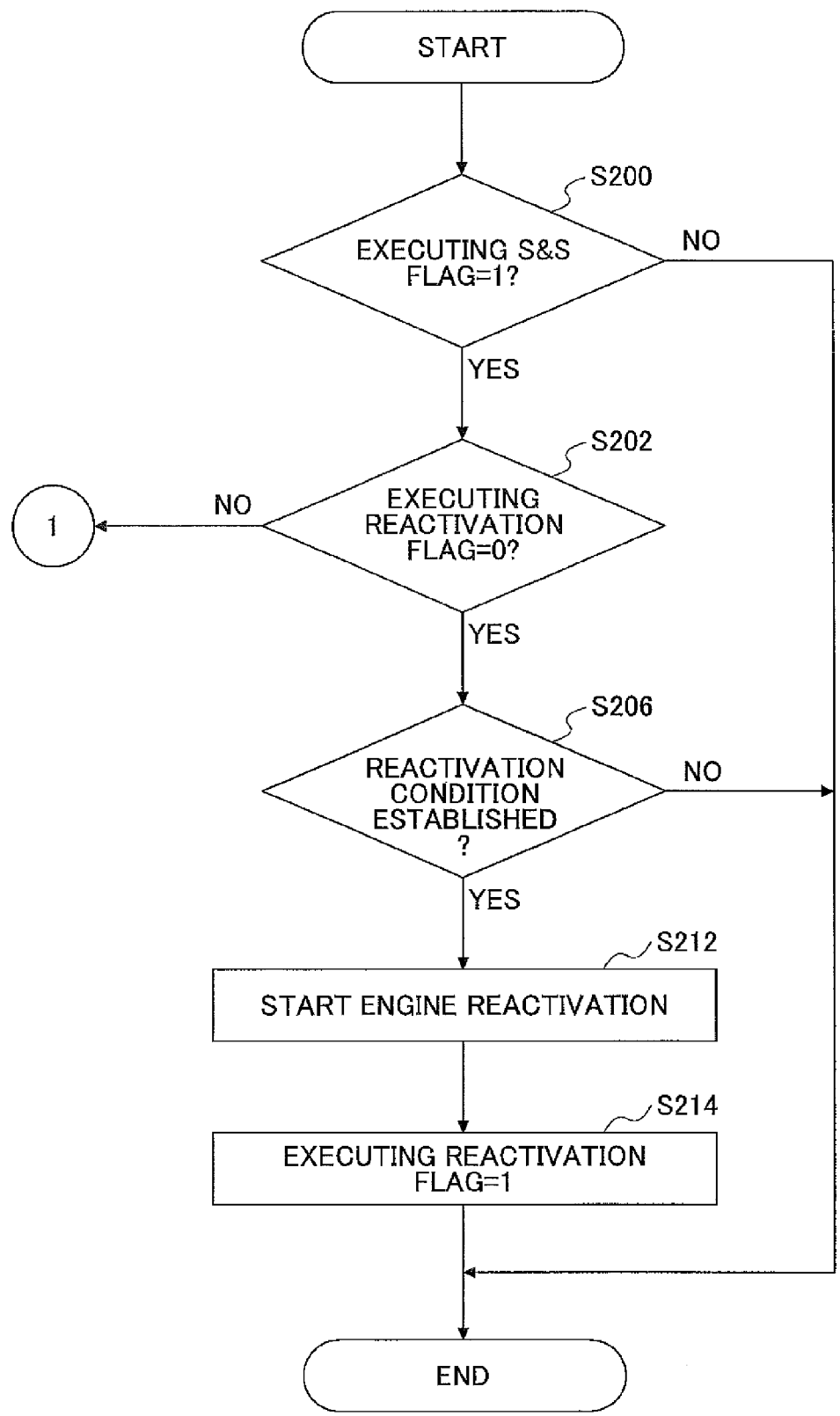
FIG. 2 is a flowchart of a part of a process executed by an idle stop control unit (part 1)

FIG. 2 is a flowchart of a part (a part relevant to the reactivation of the engine) of a process executed by the idle stop control unit 12. The process of FIG. 2 is executed at predetermined cycles.

In step S200, the idle stop control unit 12 determines whether the executing S&S flag is "1". The executing S&S flag is set to "1" when the automatic stopping of the engine is started according to the establishment of the stop condition as described above. When the executing S&S flag is "1", the process proceeds to step S202, and otherwise, the process of the present cycle is ended.

In step S202, the idle stop control unit 12 determines whether an executing reactivation flag is "0". The initial value of the executing reactivation flag is "0". When the executing reactivation flag is "0", the process proceeds to step S206, and otherwise, the process proceeds to step S302 of FIG. 3.

In step S206, the idle stop control unit 12 determines whether the reactivation condition has been established. For example, the reactivation condition is established when any one of the following conditions (4) through (6) is no longer satisfied, or when the condition (7) is satisfied.

Condition (4): The speed of the own vehicle is less than or equal to a predetermined speed.
Condition (5): The accelerator pedal is not stepped on.
Condition (6): The negative pressure inside the brake booster is closer to vacuum than a predetermined threshold.
Condition (7): A release request is generated according to an operation to the EPB switch 50. Note that in the case of a manual transmission vehicle, the reactivation condition may be satisfied in cases other than when the shift range is N (neutral).

When the reactivation condition is established, the process proceeds to step S212, and otherwise, the process of the present cycle is ended.

In step S212, the idle stop control unit 12 starts the reactivation of the engine. Specifically, the idle stop control unit 12 starts driving the starter 30. Note that the idle stop control unit 12 may determine whether the reactivation of the engine is possible, before starting the reactivation of the engine. For example, in the case of a manual transmission vehicle, when the clutch pedal is not stepped on, it may be determined that the reactivation of the engine is not possible. When the reactivation of the engine is not possible, an alert warning, etc., may be output. Furthermore, when the determination result of step S206 is "YES", the idle stop control unit 12 may start driving the starter 30, after a predetermined time (for example, 100 ms).

In step S214, the idle stop control unit 12 sets the executing reactivation flag to "1".

Figure 3:
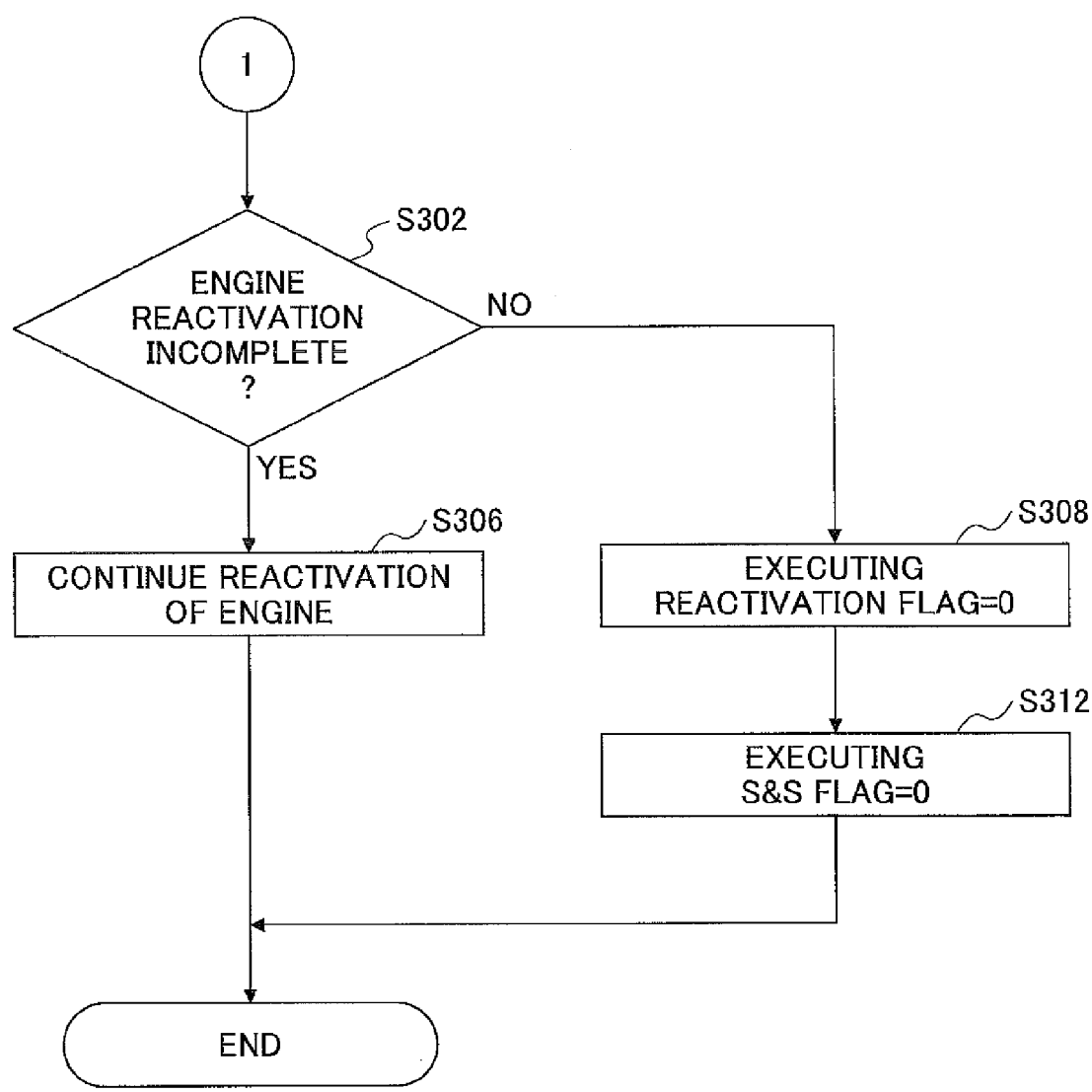
FIG. 3 is a flowchart of a part of a process executed by the idle stop control unit (part 2)

FIG. 3 is a flowchart of a part (a part relevant to the reactivation) of a process executed by the idle stop control unit 12. The process of FIG. 3 is executed when the determination result of step S202 of FIG. 2 is "NO".

In step S302, the idle stop control unit 12 determines whether the reactivation of the engine has not yet ended. The idle stop control unit 12 determines that the reactivation of the engine has not yet ended, when the engine speed is less than a predetermined idle speed. Alternatively, the idle stop control unit 12 may determine that the reactivation of the engine has not yet ended, when a predetermined time has not passed after the completion of the operation of the starter 30. When the reactivation of the engine has not yet ended, the process proceeds to step S306, and otherwise (that is, when the reactivation of the engine is completed), the process proceeds to step S308.

In step S306, the idle stop control unit 12 continues the reactivation of the engine. For example, the idle stop control unit 12 continues the driving of the starter 30.

In step S308, the idle stop control unit 12 sets the executing reactivation flag to "0".

In step S312, the idle stop control unit 12 sets the executing S&S flag to "0".

Figure 4:
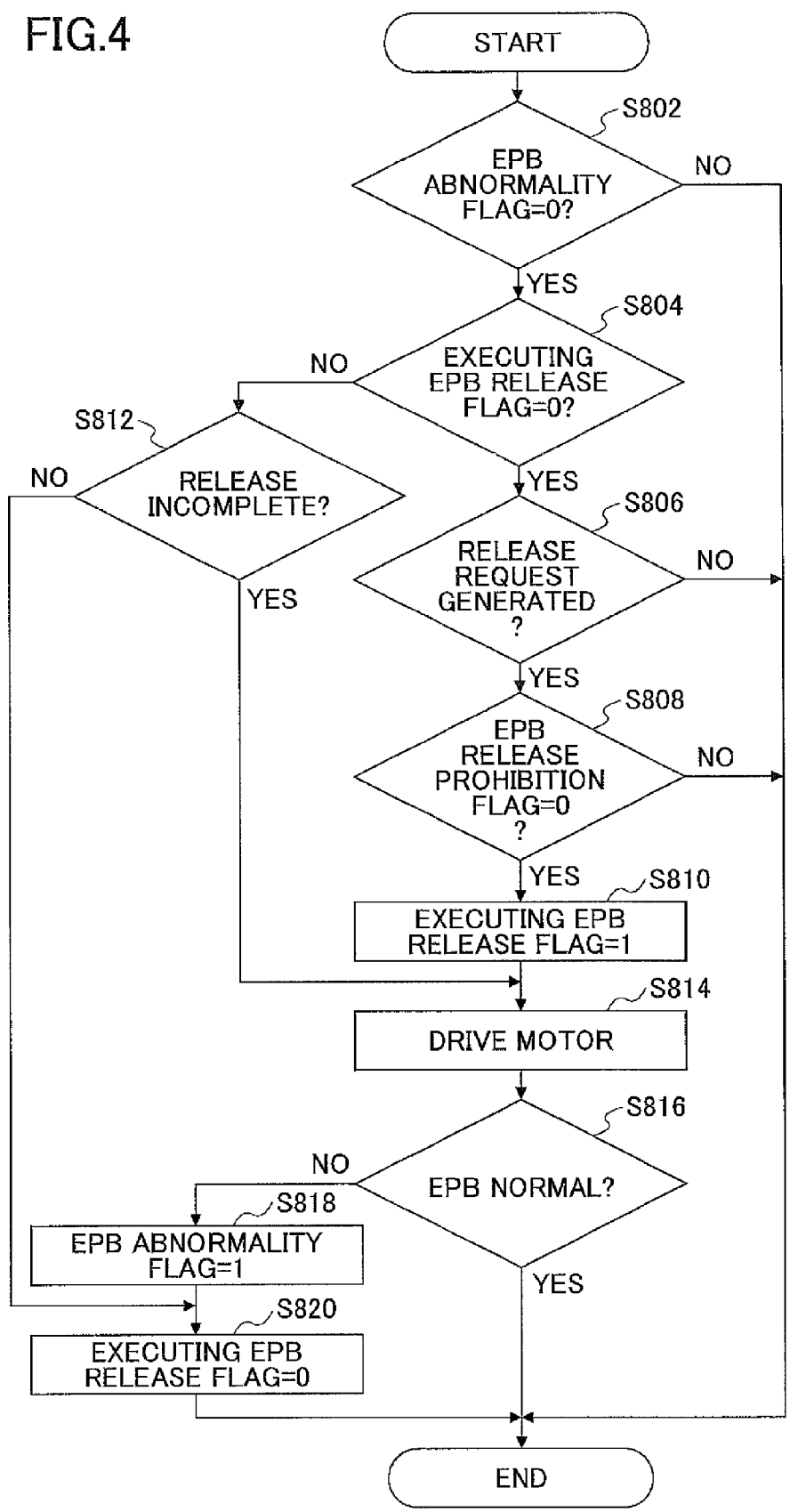
FIG. 4 is a flowchart of a part of a process executed by an EPB control unit.

FIG. 4 is a flowchart of a part (a part relevant to the release request) of a process executed by the EPB control unit 14. The process of FIG. 4 is executed at predetermined cycles.

In step S802, the EPB control unit 14 determines whether an EPB abnormality flag is "0". A state where the EPB abnormality flag is "1" indicates a state where an abnormality of the electric parking brake device 40 has been detected. The initial value of the EPB abnormality flag is "0". When the EPB abnormality flag is "0", the process proceeds to step S804, and otherwise, the process of the present cycle is ended.

In step S804, the EPB control unit 14 determines whether an executing EPB release flag is "0". The initial value of the executing EPB release flag is "0". When the executing EPB release flag is "0", the process proceeds to step S806, and otherwise, the process proceeds to step S812.

In step S806, the EPB control unit 14 determines whether a release request is generated. When a release request is generated, the process proceeds to step S808, and otherwise, the process of the present cycle is ended.

In step S808, the EPB control unit 14 determines whether the EPB release prohibition flag is "0". The initial value of the EPB release prohibition flag is "0". The state of the EPB release prohibition flag is changed by the mediating unit 16 as described below with reference to FIG. 9. When the EPB release prohibition flag is "0", the process proceeds to step S810, and otherwise, the process of the present cycle is ended.

In step S810, the EPB control unit 14 sets the executing EPB release flag to "1".

In step S812, the EPB control unit 14 determines whether the release driving is not yet completed. When the release driving is not yet completed, the process proceeds to step S814, and otherwise, the process proceeds to step S820.

In step S814, the EPB control unit 14 starts or continues the release driving. Note that when starting the release driving, when the determination result of step S808 is "YES", the EPB control unit 14 may start the release driving after a predetermined time has passed (for example, one process cycle).

In step S816, the EPB control unit 14 determines whether the electric parking brake device 40 is normal. The EPB control unit 14 may determine whether the electric parking brake device 40 is normal based on an operation state, etc., of the electric motor 42. When the electric parking brake device 40 is normal, the process of the present cycle is ended, and otherwise, the process proceeds to step S818.

In step S818, the EPB control unit 14 sets the EPB abnormality flag to "1". When the process of step S818 is ended, the process proceeds to step S820.

In step S820, the EPB control unit 14 sets the executing EPB release flag to "0".

According to the process of FIG. 4, even when a release request is generated, if the EPB release prohibition flag is "1", the EPB control unit 14 prohibits the release driving ("NO" in step S808).

Figure 5:
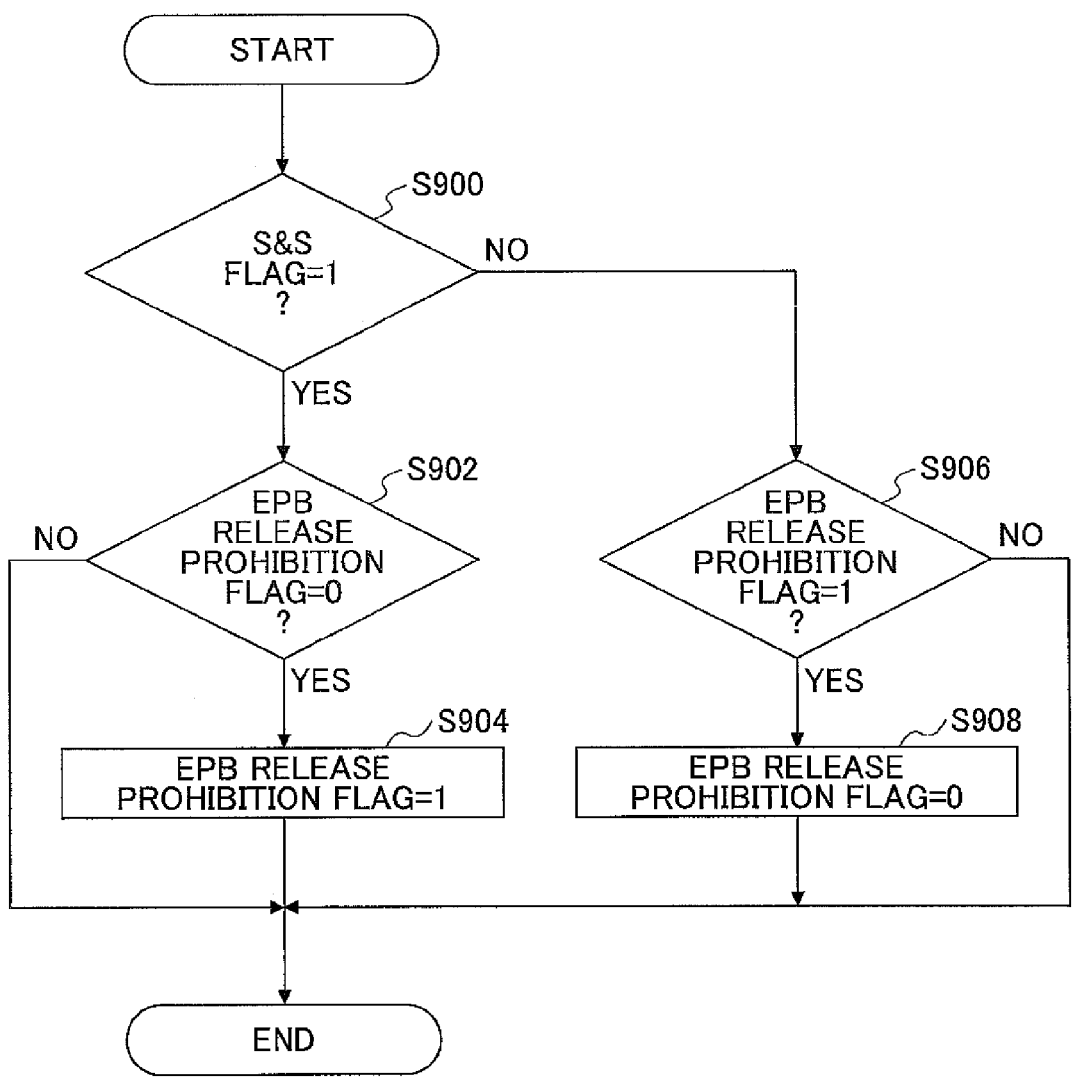
FIG. 5 is a flowchart of a process executed by a mediating unit.

FIG. 5 is a flowchart of a process executed by the mediating unit 16. The process of FIG. 5 is executed at predetermined cycles.

In step S900, the mediating unit 16 determines whether the executing S&S flag is "1". The executing S&S flag is set to "1" when the automatic stopping of the engine is started according to the establishment of the stop condition as described above. When the executing S&S flag is "1", the process proceeds to step S902, and otherwise, the process proceeds to step S906.

In step S902, the mediating unit 16 determines whether the EPB release prohibition flag is "0". When the EPB release prohibition flag is "0", the process proceeds to step S904, and otherwise, the process of the present cycle is ended.

In step S904, the mediating unit 16 sets the EPB release prohibition flag to "1".

In step S906, the mediating unit 16 determines whether the EPB release prohibition flag is "1". When the EPB release prohibition flag is "1", the process proceeds to step S908, and otherwise, the process of the present cycle is ended.

In step S908, the mediating unit 16 is able to set and maintain the EPB release prohibition flag to "1", during a period from when the automatic stop of the engine is started by the idle stop control unit 12 to when the reactivation is completed (step S904). When the EPB release prohibition flag is "1", as described above, the release driving by the EPB control unit 14 is prohibited ("NO" in step S808). As described above, according to the process of FIG. 5, when the engine is reactivated in response to a release request, it is possible to prohibit the release driving of the electric motor 42 by the EPB control unit 14 in response to the release request. Furthermore, according to the process of FIG. 5, when the engine is reactivating, it is possible to prohibit the release driving of the electric motor 42 by the EPB control unit 14.

Note that in the process of FIG. 5, when the executing S&S flag is changed from "1" to "0" as the reactivation of the engine is completed, the mediating unit 16 changes the EPB release prohibition flag from "1" to "0"; however, the mediating unit 16 may change the EPB release prohibition flag from "1" to "0" when the driving of the starter 30 is completed. The driving state of the starter 30 may be determined based on information (flag) from the idle stop control unit 12.

Figure 6:
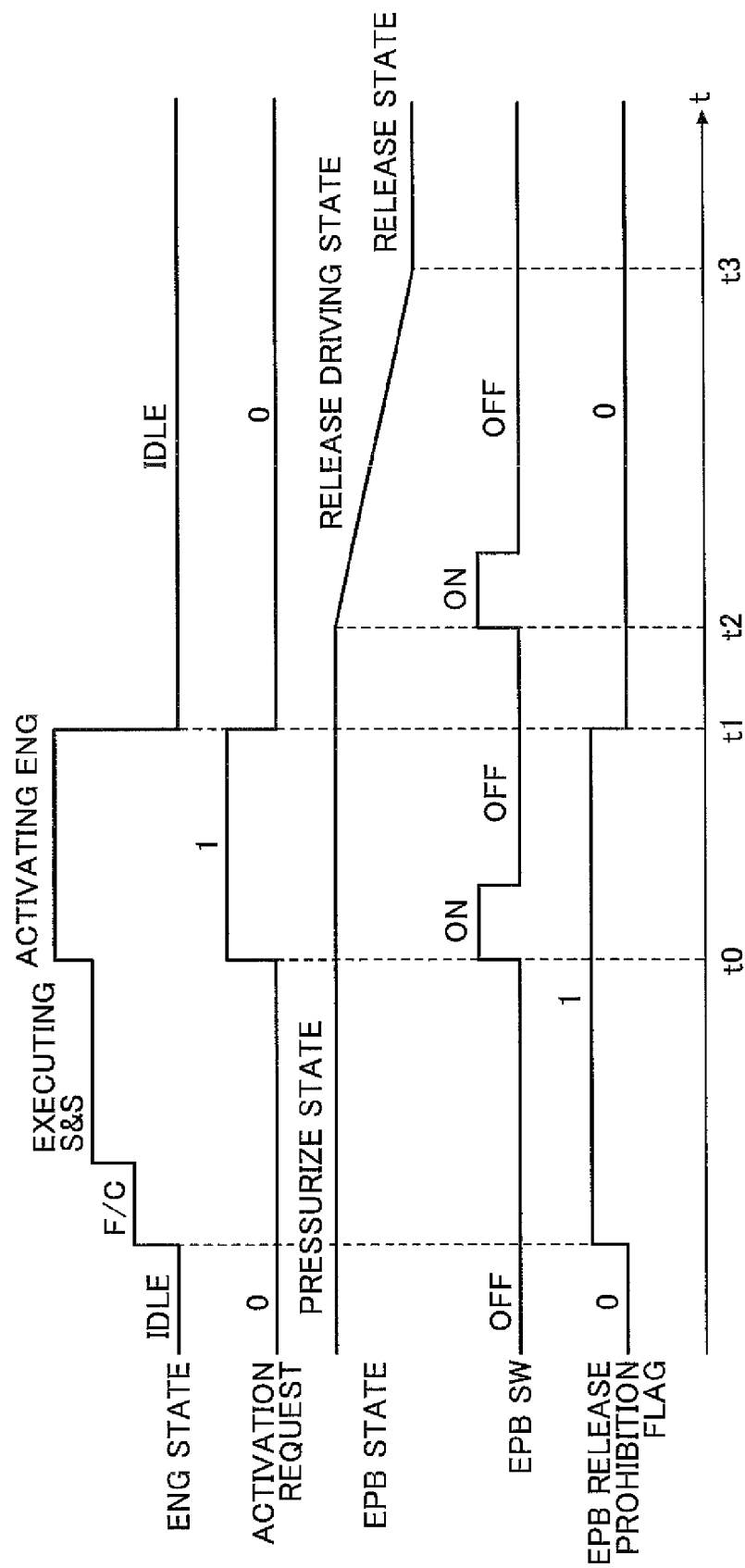
FIG. 6 is a timing chart of an example of changes in time series of the respective states when reactivating an engine.

FIG. 6 is a timing chart of an example of changes in time series of the respective states when reactivating an engine. The changes in time series illustrated in FIG. 6 are realized by the processes illustrated in FIGS. 4 and 5. In FIG. 6, the state of the engine (ENG state), the state of the executing reactivation flag (activation request), the state of the electric motor 42 (EPB state), the state of the EPB switch 50 (EPB SW), and the state of the EPB release prohibition flag, are illustrated in the stated order from the top. As the state of the engine, an idle state is expressed by "idle", a fuel cut state is expressed by "F/C", a state before reactivation after completing the engine automatic stop is expressed by "executing S&S", and an engine reactivation state is expressed by "reactivating ENG". Furthermore, the state of the electric motor 42 is expressed by "release driving state" which is the driving state (release driving state) according to the release request, and "release state" which is the state where the release driving according to the release request has ended. The "release state" is realized initially or after the release driving is completed, and corresponds to a state where a braking force is not applied by the electric parking brake device. The "pressurize state" corresponds to a state where a braking force is applied by the electric parking brake device.

In the example of FIG. 6, after the completion of the engine automatic stop, at the time t0, a release request is generated as the driver operates the EPB switch 50, and accordingly, a reactivation condition is established ("YES" in step S206), and the reactivation of the engine is started (step S212). At this time, the EPB release prohibition flag which has been set to "1" according to the engine automatic stop, remains as "1". Therefore, the release driving according to the release request generated at the time t0 is prohibited ("NO" in step S808). This prohibition state is continued until the time t1 at which the reactivation of the engine is completed and the EPB release prohibition flag becomes "0" (step S908). At the time t2 after the time t1, a release request is generated as the driver operates the EPB switch 50 again. At the time t2, the engine is in an operating state, and therefore the EPB release prohibition flag is not "1". Therefore, the electric motor 42 is caused to perform release driving in response to the release request generated at the time t2 (step S814). In the example of FIG. 6, the release driving state of the electric motor 42 is completed at the time t3 ("NO" in step S812).

Figure 7:
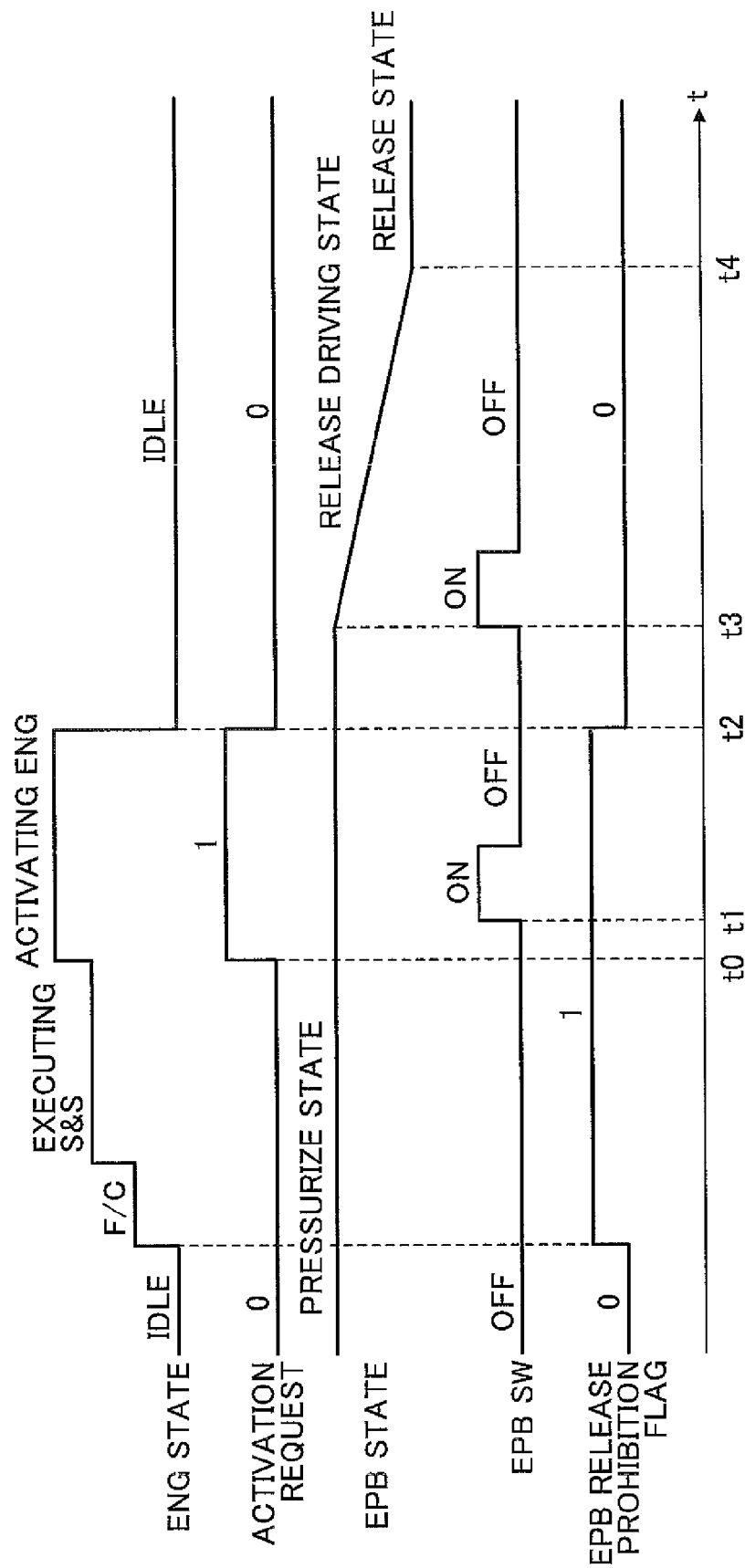
FIG. 7 is a timing chart of another example of changes in time series of the respective states when reactivating an engine.

FIG. 7 is a timing chart of another example of changes in time series of the respective states when reactivating an engine. The changes in time series illustrated in FIG. 7 are realized by the processes illustrated in FIGS. 4 and 5. The expressions are the same as those of FIG. 6.

In the example of FIG. 7, after the completion of the engine automatic stop, at the time to, a reactivation condition is established without being caused by a release request ("YES" in step S206), and the reactivation of the engine is started (step S212). At the time t1, a release request is generated as the driver operates the EPB switch 50. At this time, the EPB release prohibition flag which has been set to "1" according to the engine automatic stop, remains as "1". Therefore, the release driving according to the release request generated at the time t1 is prohibited ("NO" in step S808). This prohibition state is continued until the time t2 at which the reactivation of the engine is completed and the EPS release prohibition flag becomes "0" (step S908). At the time t3 after the time t2, a release request is generated as the driver operates the EPB switch 50 again. At the time t3, the engine is in an operating state, and therefore the EPB release prohibition flag is not "1". Therefore, the electric motor 42 is caused to perform release driving in response to the release request generated at the time t3 (step S814). In the example of FIG. 7, the release driving state of the electric motor 42 is completed at the time t4 ("NO" in step S812).

According to the present embodiment, the reactivation condition is established when a release request is generated, and when the reactivation condition is established, the EPB release prohibition flag is set to "1". Accordingly, the reactivation condition will not be established during the release driving of the electric motor 42. Furthermore, when the engine is being reactivated by the idle stop control unit 12, the EPB release prohibition flag is maintained at "1". Therefore, it is possible to prevent a situation where both the release driving of the electric motor 42 and the driving state of the starter 30 for the reactivation of the engine by the idle stop control unit 12, are realized at the same time. Accordingly, the load on the battery 80 can be reduced, compared to a configuration in which the release driving state of the electric motor 42 and the driving state of the starter 30 may be realized at the same time when reactivating the engine. As a result, it is possible to reduce the inconvenience that arises when the release driving state of the electric motor 42 and the driving state of the starter 30 are realized at the same time; typically, the inconvenience in which the release driving of the electric motor 42 and/or the driving of the starter 30 cannot be implemented in a desired mode due to a drop in the voltage of the battery 80.

Furthermore, in the present embodiment, the electric parking brake device 40 operates in response to input from the driver via the EPB switch 50. That is, the EPB control unit 14 causes the electric motor 42 to perform pressurize driving in response to a pressurizing request, and also causes the electric motor 42 to perform release driving in response to a release request (however, with respect to the release request, there are cases where release driving is prohibited as described above). Therefore, according to the present embodiment, the electric parking brake device 40 can be configured to operate in response to input from the driver, and therefore it is possible to realize a drive mode in which the driver's intention is reflected.

According to the present embodiment, the reactivation of the engine is prioritized over the release driving, and therefore it is possible to avoid inconveniences (for example, the vehicle slips down) that may arise when reactivation of the engine is executed after release driving. That is, according to the present embodiment, it is possible to avoid a situation where the release state of the electric parking brake device is realized during the reactivation of the engine, and therefore it is possible to avoid a situation where the vehicle slips down while the engine is being reactivated.

Preferred embodiments of the present invention are described above; however, the present invention is not limited to the specific embodiments described herein, and variations and modifications may be made without departing from the spirit and scope of the present invention.

For example, in the embodiment described above, the reactivation condition is satisfied when a release request is generated by an operation to the EPB switch 50; however, the reactivation condition may not be satisfied when a release request is generated. In this case, in the process of FIG. 5, in step S900, the mediating unit 16 determines whether the engine is being reactivated by the idle stop control unit 12. The determination as to whether the engine is being reactivated may be made based on whether the executing reactivation flag is "1". Alternatively, the mediating unit 16 may determine whether the reactivation condition establish flag is "1", instead of whether the executing reactivation flag is "1". Alternatively, the mediating unit 16 may determine that the engine is being reactivated, from when the executing reactivation flag (or the reactivation condition establish flag) becomes "1" to when the driving of the starter 30 is completed. When the engine is being reactivated, the process proceeds to step S902, and otherwise, the process proceeds to step S906. In this modified example, the reactivation condition may be established during the release driving according to a release request. When the reactivation condition is established during the release driving according to a release request, both driving states are allowed, or the release driving is discontinued, and reactivation of the engine is executed.

Furthermore, in the embodiment described above, when a release request is generated during reactivation after the reactivation starting point, the release driving of the electric motor 42 according to the release request is prohibited (see FIG. 7); however, the vehicle engine activation control system 1 may have a configuration in which the prohibition is not executed. In such a configuration also, when a release request is generated during engine automatic stop or after completion of engine automatic stop, by prohibiting the release driving of the electric motor 42 according to the release request (see FIG. 6), the load on the battery 80 can be reduced with respect to the engine reactivation in response to the release request.

Furthermore, in the embodiment described above, the operation of the electric parking brake device is realized according to input form the EPB switch 50; however, as another mode, it may be possible to select an automatic mode. In this case, in the automatic mode, the operation of the electric parking brake device (pressurize driving and release driving of the electric motor 42) is automatically realized according to, for example, the control state of the idle stop control unit 12.

Furthermore, in the embodiment described above, the EPB switch 50 may be able to generate a release request, not only in the pressurize state but also in the pressurize driving state. Similarly, the EPB switch 50 may be able to generate a pressurizing request, not only in the release state but also in the release driving state.

Furthermore, in the embodiment described above, the function of the mediating unit 16 may be realized by the EPB control unit 14. For example, in the embodiment described above, when the EPB control unit 14 executes the process of the mediating unit 16 of FIG. 5, the EPB control unit 14 may determine whether the executing S&S flag is "0", instead of the process of step S808.

Furthermore, in the embodiment described above, the mediating unit 16 prioritizes the reactivation of the engine only with respect to a release request; however, the mediating unit 16 may also prioritize the reactivation of the engine with respect to a pressurizing request, by the same mode as the release request. Specifically, the processes of FIGS. 4 and 5, in which "release" is replaced with "pressurize", may be executed instead of the processes of FIGS. 4 and 5. In this case, the condition (7) relevant to the reactivation condition may be replaced with the following condition (7-1). Condition (7-1) Either a release request or a pressurizing request is generated by operating the EPB switch 50.

Furthermore, in the embodiment described above, the mediating unit 16 prioritizes the reactivation of the engine only with respect to a release request; however, the mediating unit 16 may prioritize the reactivation of the engine only with respect to a pressurizing request. For example, the processes of FIGS. 4 and 5, in which "release" is replaced with "pressurize", may be executed instead of the processes of FIGS. 4 and 5. In this case, the condition (7) relevant to the reactivation condition may be replaced with the following condition (7-2).
Condition (7-2) A pressurizing request is generated by operating the EPB switch 50.
In the following, the above modified example is referred to as "modified example 2". In modified example 2, when a pressurizing request is generated during reactivation after the reactivation starting point, the release driving of the electric motor 42 according to the pressurizing request is prohibited; however, the vehicle engine activation control system 1 may have a configuration in which the prohibition is not executed. In such a configuration also, when a pressurizing request is generated during engine automatic stop or after completion of engine automatic stop, by prohibiting the pressurize driving of the electric motor 42 according to the pressurizing request, the load on the battery 80 can be reduced with respect to the engine reactivation in response to the pressurizing request. Furthermore, in the modified example 2, the condition (7-2) relevant to the reactivation condition may be omitted. In the following, this further modified example is referred to as "modified example 3". In this case, in the process of FIG. 5, in step S900, the mediating unit 16 determines whether the engine is being reactivated by the idle stop control unit 12. In the modified example 3, the reactivation condition may be established during pressurize driving according to the pressurizing request. However, when the reactivation condition is established during the pressurize driving according to a pressurizing request, both driving states are allowed, or the pressurize driving is discontinued, and reactivation of the engine is executed.

Furthermore, in the example of FIG. 4, even when a release request is generated once, if the release driving relevant to the release request is prohibited because the EPB release prohibition flag is "1", it is necessary to generate a new release request in order to realize release driving. However, the present example is not so limited. For example, as long as the EPB abnormality flag is "0", once a release request is generated, even when the release driving relevant to the release request is prohibited because the EPB release prohibition flag is "1", a release wait state of waiting for the prohibition state may be realized (a state of waiting for the EPB release prohibition flag to become "0"). In this case, for example, assuming that a driver operates the EPB switch 50 to generate a release request after the engine automatic stop is completed, the release driving is prohibited (waited on), and the engine is reactivated; however, the release driving is realized after the engine is reactivated (without the need of operating the EPB switch 50 again).

According to the embodiments, it is possible to provide a vehicle engine activation control system capable of reducing the load on the battery when reactivating the engine according to idle stop control, while configuring the electric parking brake device to operate according to input from the driver.

The present application is based on and claims the benefit of priority of Japanese Priority Application No. 2015-089755, filed on Apr. 24, 2015, the entire contents of which are hereby incorporated herein by reference.

What is claimed is:

1. A vehicle engine activation control system comprising:
a starter connected to a battery;
an input unit configured to generate an operation request in response to input from a driver;
an electric parking brake device including an electric motor connected to the battery, wherein the electric motor starts driving in response to the operation request;
an idle stop control unit configured to automatically stop an engine of the vehicle and automatically reactivate the engine by the starter; and
a mediating unit configured to prohibit the driving of the electric motor in response to a predetermined operation request, in at least one of a first case and a second case, the first case being where the predetermined operation request is generated while the engine is automatically stopping or after the automatic stopping of the engine is completed, and the second case being where the predetermined operation request is generated during the reactivation of the engine.

2. The vehicle engine activation control system according to claim 1, wherein the operation request includes
a pressurizing request generated in a first state and a release request generated in a second state the second state being different from the first state, the first state being a release state of the electric parking brake device, the second state being a pressurize state of the electric parking brake device, wherein the pressurizing request is for requesting the pressurize state in which a braking force is applied on a wheel of the vehicle, and the release request is for requesting the release state in which the braking force applied on the wheel is released, and wherein the predetermined operation request includes at least one of the pressurizing request and the release request.

3. The vehicle engine activation control system according to claim 2, wherein the predetermined operation request includes the release request, the mediating unit prohibits the driving of the electric motor in response to the release request, when the release request is generated while the engine is automatically stopping or after the automatic stopping of the engine is completed, and the idle stop control unit automatically reactivates the engine, when the release request is generated while the engine is automatically stopping or after the automatic stopping of the engine is completed.

4. The vehicle engine activation control system according to claim 3, wherein the mediating unit further prohibits the driving of the electric motor in response to the release request, when the release request is generated during the reactivation of the engine.

* * * * *